United States Patent
Li et al.

(10) Patent No.: US 9,019,235 B2
(45) Date of Patent: Apr. 28, 2015

(54) METHOD OF DRIVING TOUCH DISPLAY AND TOUCH DISPLAY CAPABLE OF INCREASING SIGNAL-TO-NOISE RATIO

(71) Applicant: Chunghwa Picture Tubes, Ltd., Taoyuan (TW)

(72) Inventors: Yu-Chen Li, Taoyuan County (TW); Chao-Yong Hsu, Taoyuan County (TW); Shih-Hung Huang, Taoyuan County (TW); Hung-Hsiang Chen, Taoyuan County (TW)

(73) Assignee: Chunghwa Picture Tubes, Ltd., Longtan Dist., Taoyuan (TW)

( * ) Notice: Subject to any disclaimer, the term of this patent is extended or adjusted under 35 U.S.C. 154(b) by 0 days.

(21) Appl. No.: 14/088,444

(22) Filed: Nov. 25, 2013

(65) Prior Publication Data

US 2015/0022486 A1 Jan. 22, 2015

(30) Foreign Application Priority Data

Jul. 22, 2013 (TW) .............................. 102126143 A (51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01)

(58) Field of Classification Search
CPC ........................................ G06F 3/041–3/04897
USPC .................................................. 345/173–183
See application file for complete search history.

(56) References Cited

U.S. PATENT DOCUMENTS

| 2010/0079394 A1* | 4/2010 | Tanaka et al. ................. 345/173 |
| 2010/0214262 A1* | 8/2010 | Ishizaki et al. ................ 345/174 |
| 2011/0001723 A1 | 1/2011 | Fan |
| 2012/0019454 A1* | 1/2012 | Huang .......................... 345/173 |
| 2012/0044166 A1* | 2/2012 | Mizuhashi et al. ........... 345/173 |
| 2012/0068961 A1* | 3/2012 | Mizuhashi et al. ........... 345/174 |
| 2012/0098776 A1* | 4/2012 | Chen et al. ................... 345/173 |
| 2012/0113045 A1* | 5/2012 | Lai ................................ 345/174 |
| 2012/0262390 A1* | 10/2012 | Kida et al. .................... 345/173 |
| 2012/0313866 A1* | 12/2012 | Ha et al. ....................... 345/173 |
| 2013/0069894 A1* | 3/2013 | Chen et al. ................... 345/173 |
| 2013/0176251 A1* | 7/2013 | Wyatt et al. .................. 345/173 |
| 2013/0321296 A1* | 12/2013 | Lee et al. ..................... 345/173 |

(Continued)

FOREIGN PATENT DOCUMENTS

TW 201028905 8/2010

*Primary Examiner* — Gene W Lee
(74) *Attorney, Agent, or Firm* — Winston Hsu; Scott Margo (57) ABSTRACT

A method of driving touch display includes a switching circuit driving each block of N blocks of a touch panel to display a corresponding image according to a driving signal generated by a liquid crystal driving unit during a first predetermined time within each horizontal synchronization signal period corresponding to the block between two vertical synchronization signals of the touch panel; the switching circuit executing touch scanning on M blocks of the N blocks only corresponding to the block according to touch scanning signals generated by a touch control unit during a second predetermined time within the horizontal synchronization signal period; and the touch control unit receiving and processing a touch scanning result corresponding to each block of the M blocks through the switching circuit during a third predetermined time within the horizontal synchronization signal period, where N and M are integers, and M is smaller than N.

10 Claims, 8 Drawing Sheets

(56) References Cited

U.S. PATENT DOCUMENTS

| | | |
|---|---|---|
| 2014/0022185 A1* | 1/2014 | Ribeiro et al. ............... 345/173 |
| 2014/0062907 A1* | 3/2014 | Kim ............................. 345/173 |
| 2014/0111467 A1* | 4/2014 | Chen et al. .................... 345/174 |
| 2014/0184539 A1* | 7/2014 | Shin ............................. 345/173 |
| 2014/0240279 A1* | 8/2014 | Hwang et al. ................. 345/174 |
| 2014/0285465 A1* | 9/2014 | Hayashi et al. ............... 345/174 |
| 2014/0292709 A1* | 10/2014 | Mizuhashi et al. ........... 345/174 |

* cited by examiner

METHOD OF DRIVING TOUCH DISPLAY AND TOUCH DISPLAY CAPABLE OF INCREASING SIGNAL-TO-NOISE RATIO

BACKGROUND OF THE INVENTION

1. Field of the Invention

The present invention relates to a method of driving touch display and a touch display capable of increasing signal-to-noise ratio, and particularly to a method of driving touch display and a touch display that can utilize a channel division multiplexing driving method to increase a signal-to-noise ratio of a touch panel of the touch display.

2. Description of the Prior Art

Figure 1:
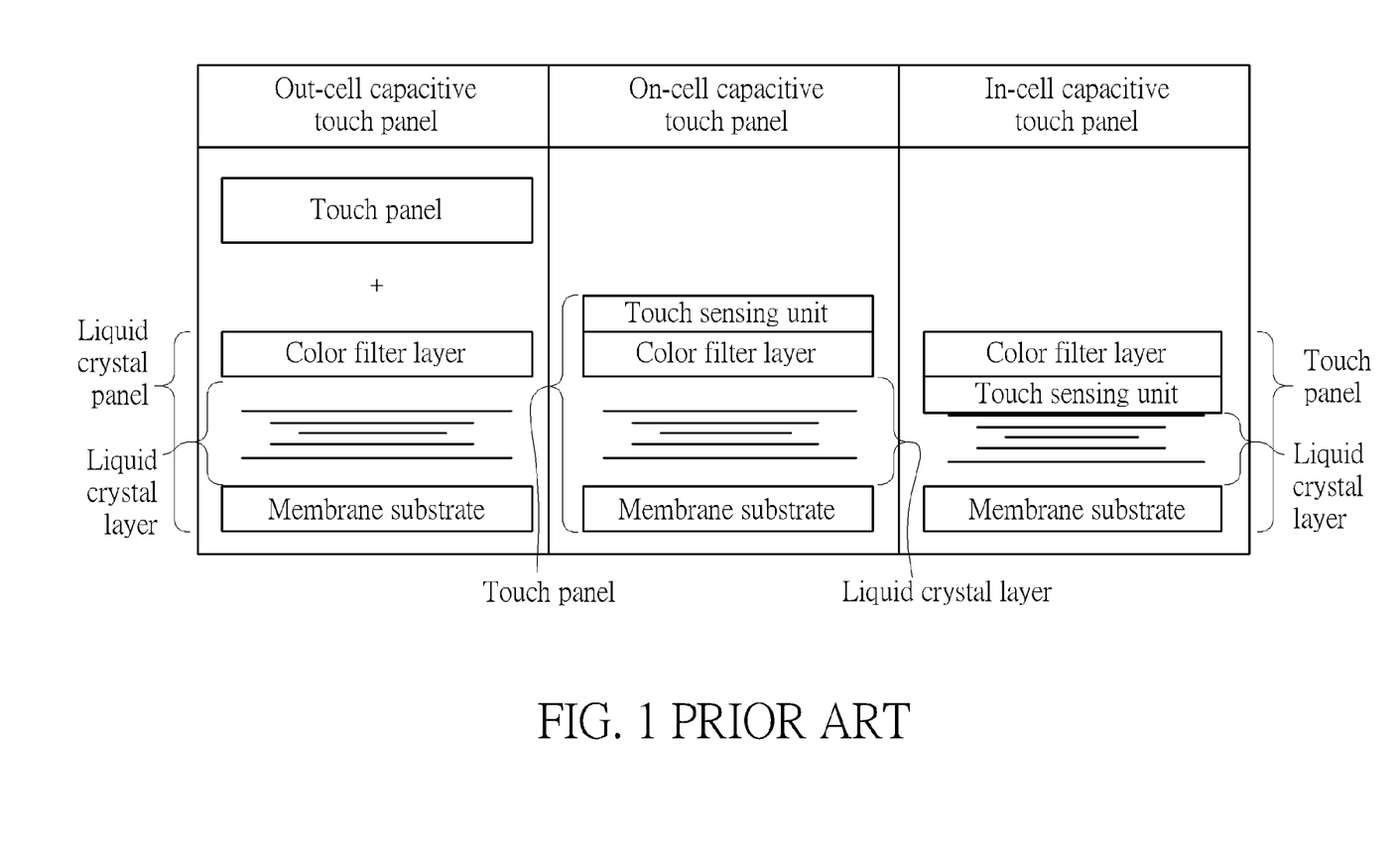
FIG. 1 is a diagram illustrating three capacitive touch panels according to the prior art.

Please refer to FIG. 1. FIG. 1 is a diagram illustrating three capacitive touch panels according to the prior art. As shown in FIG. 1, the prior art can divide capacitive touch panels into an out-cell capacitive touch panel, an on-cell capacitive touch panel, and an in-cell capacitive touch panel according to structures of the capacitive touch panels, wherein a touch panel and a liquid crystal panel of the out-cell capacitive touch panel adhere to each other; a process of touch sensing units of the on-cell capacitive touch panel is directly implemented on a color filter layer of the on-cell capacitive touch panel; and a process of touch sensing units of the in-cell capacitive touch panel is implemented in a liquid crystal layer of the in-cell capacitive touch panel. Currently, the out-cell capacitive touch panel is more popular. However, because thickness of touch panels of the on-cell capacitive touch panel and the in-cell capacitive touch panel is smaller, a touch panel designer gradually pays attention to the on-cell capacitive touch panel and the in-cell capacitive touch panel.

Figure 2:
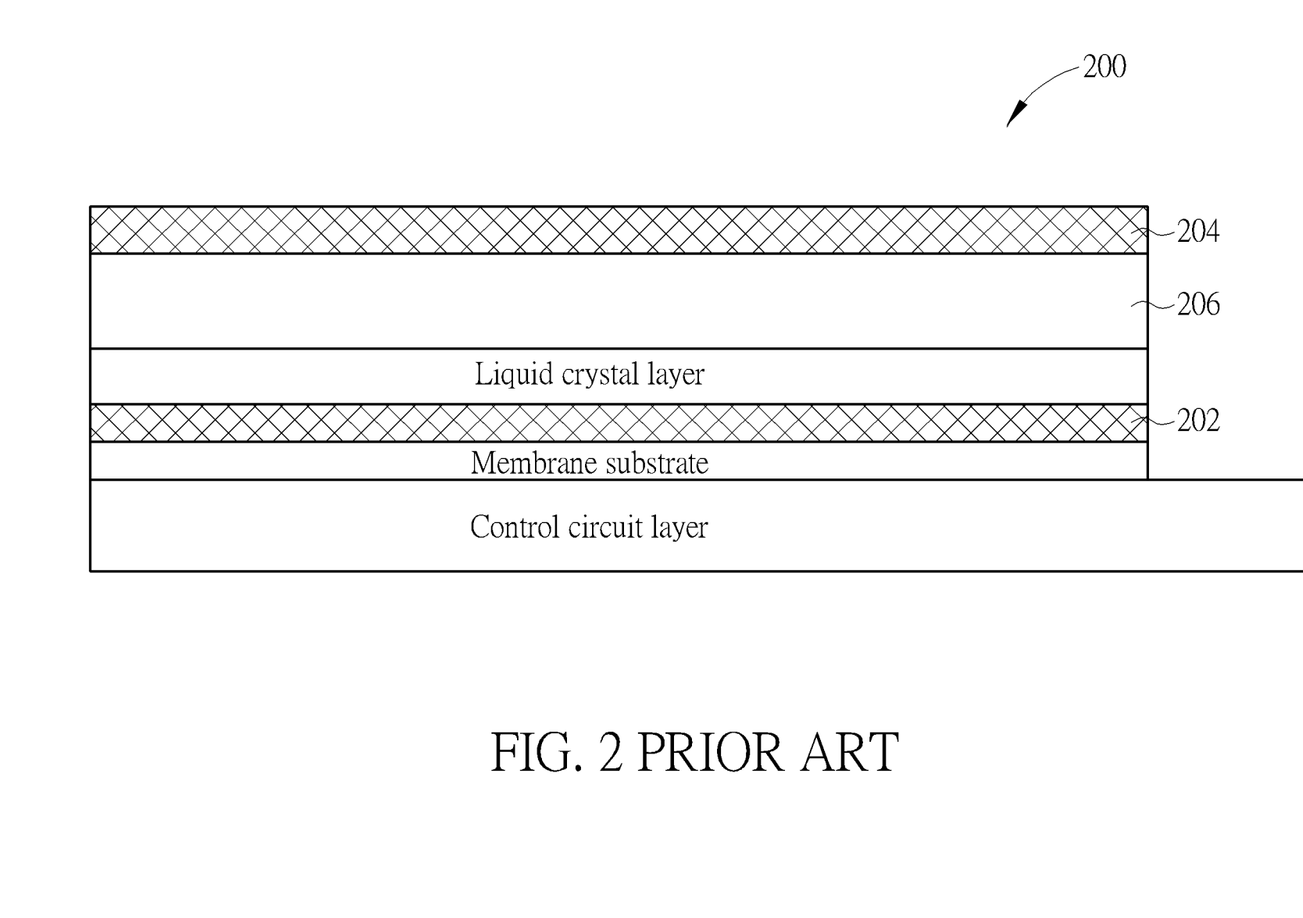
FIG. 2 is a diagram illustrating a common type touch panel according to the prior art.

In in-cell capacitive touch panel technologies, a common type technology of integrating a common voltage layer and a touch sensing unit driving layer of a liquid crystal panel are the most popular. Although the common type technology has high integrity, structure and signal processing of a touch panel of the common type technology are more complicated. Please refer to FIG. 2. FIG. 2 is a diagram illustrating a common type touch panel 200 according to the prior art. As shown in FIG. 2, a common voltage layer 202 of a liquid crystal panel also simultaneously acts as a touch sensing unit driving layer, and a touch sensing unit driving layer 204 is installed on a color filter layer 206.

As shown in FIG. 2, because the common voltage layer 202 of the liquid crystal panel of the common type touch panel 200 simultaneously acts as the touch sensing unit driving layer, the prior art utilizes a time division multiplexing driving method to execute display and touch scanning of the common type touch panel 200. That is to say, the prior art utilizes the time division multiplexing driving method to execute display and touch scanning of the common type touch panel 200 within each horizontal synchronization signal blanking time of the common type touch panel 200, wherein the time division multiplexing driving method is also applied to the on-cell capacitive touch panel and the in-cell capacitive touch panel.

Because the prior art utilizes the time division multiplexing driving method to execute display and touch scanning of a block of a touch panel within each horizontal synchronization signal blanking time of the touch panel, scanning time is insufficient for the block of the touch panel. In addition, a frequency of a touch scanning signal of the touch panel is fixed and can not be adjusted, so a report rate of the touch panel is limited (e.g. 60 Hz). Further, because a number horizontal synchronization signal blanking time within a frame of the touch panel is finite, the prior art can not increase a signal-to-noise ratio of the touch panel even if the prior art utilizes an accumulated raw data method, resulting in performance of the touch panel being decreased.

SUMMARY OF THE INVENTION

An embodiment provides a method of driving touch display, wherein the touch display includes a liquid crystal driving unit, a touch control unit, a switching circuit, and a touch panel, wherein the touch panel includes N blocks, and N is a positive integer. The method includes the switching circuit driving each block of the N blocks to display a corresponding image according to a driving signal generated by the liquid crystal driving unit during a first predetermined time within each horizontal synchronization signal period corresponding to the block between two vertical synchronization signals of the touch panel; the switching circuit executing touch scanning on M blocks of the N blocks only corresponding to the block according to touch scanning signals generated by the touch control unit during a second predetermined time within the horizontal synchronization signal, wherein M is a positive integer, M is less than N, and the second predetermined time overlaps the first predetermined time; and the touch control unit receiving and processing a touch scanning result corresponding to each block of the M blocks through the switching circuit during a third predetermined time within the horizontal synchronization signal after the second predetermined time.

Another embodiment provides a touch display capable of increasing signal-to-noise ratio. The touch display includes a liquid crystal driving unit, a touch control unit, a switching circuit, and a touch panel. The touch panel includes N blocks, and N is a positive integer. The switching circuit drives each block of the N blocks to display a corresponding image according to a driving signal generated by the liquid crystal driving unit during a first predetermined time within each horizontal synchronization signal period corresponding to the block between two vertical synchronization signals of the touch panel. The switching circuit executes touch scanning on M blocks of the N blocks only corresponding to the block according to touch scanning signals generated by the touch control unit during a second predetermined time within the horizontal synchronization signal, wherein M is a positive integer, M is less than N, and the second predetermined time overlaps the first predetermined time. The touch control unit receives and processes a touch scanning result corresponding to each block of the M blocks through the switching circuit during a third predetermined time within the horizontal synchronization signal after the second predetermined time.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
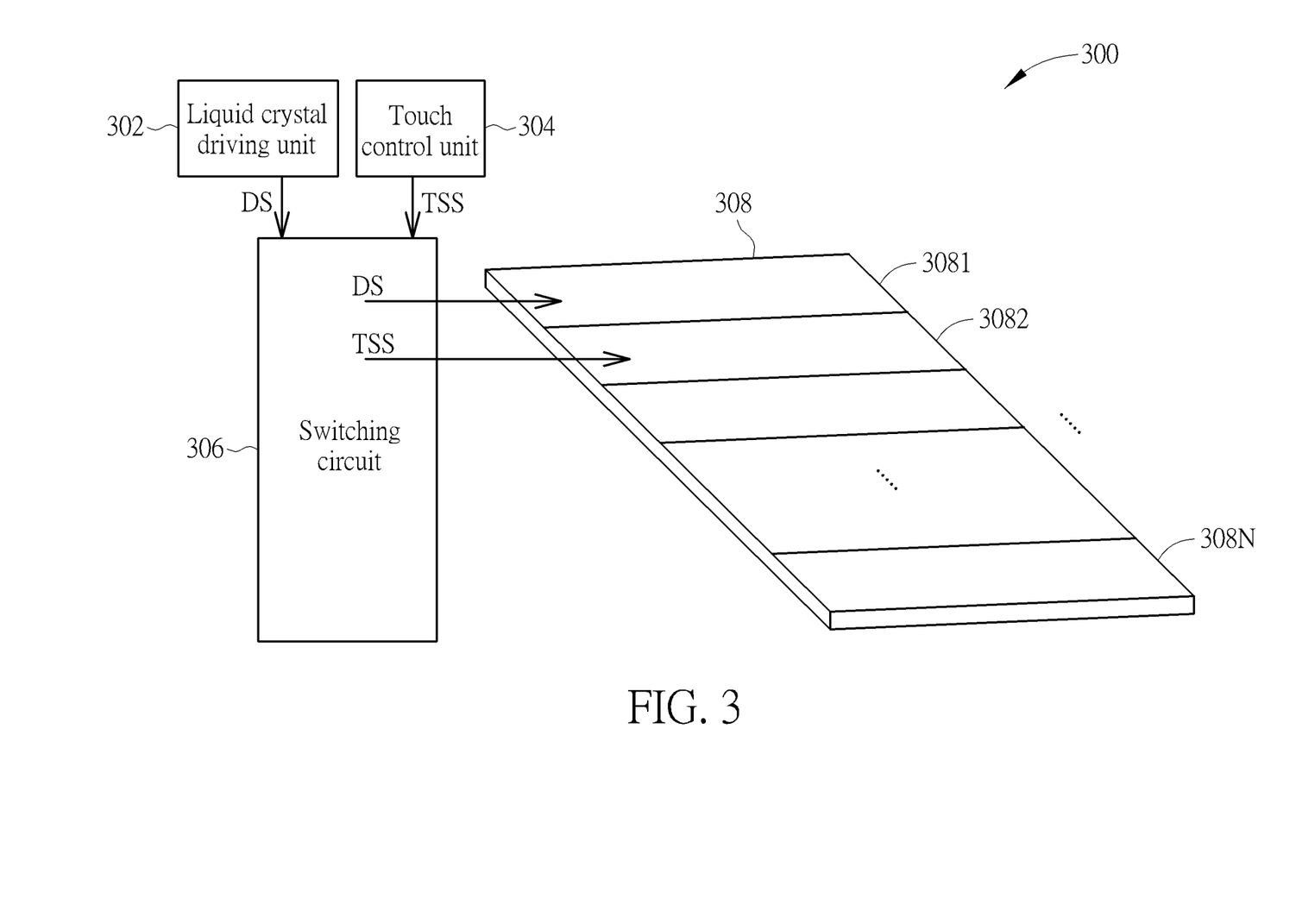
FIG. 3 is a diagram illustrating a touch display.
Figure 4:
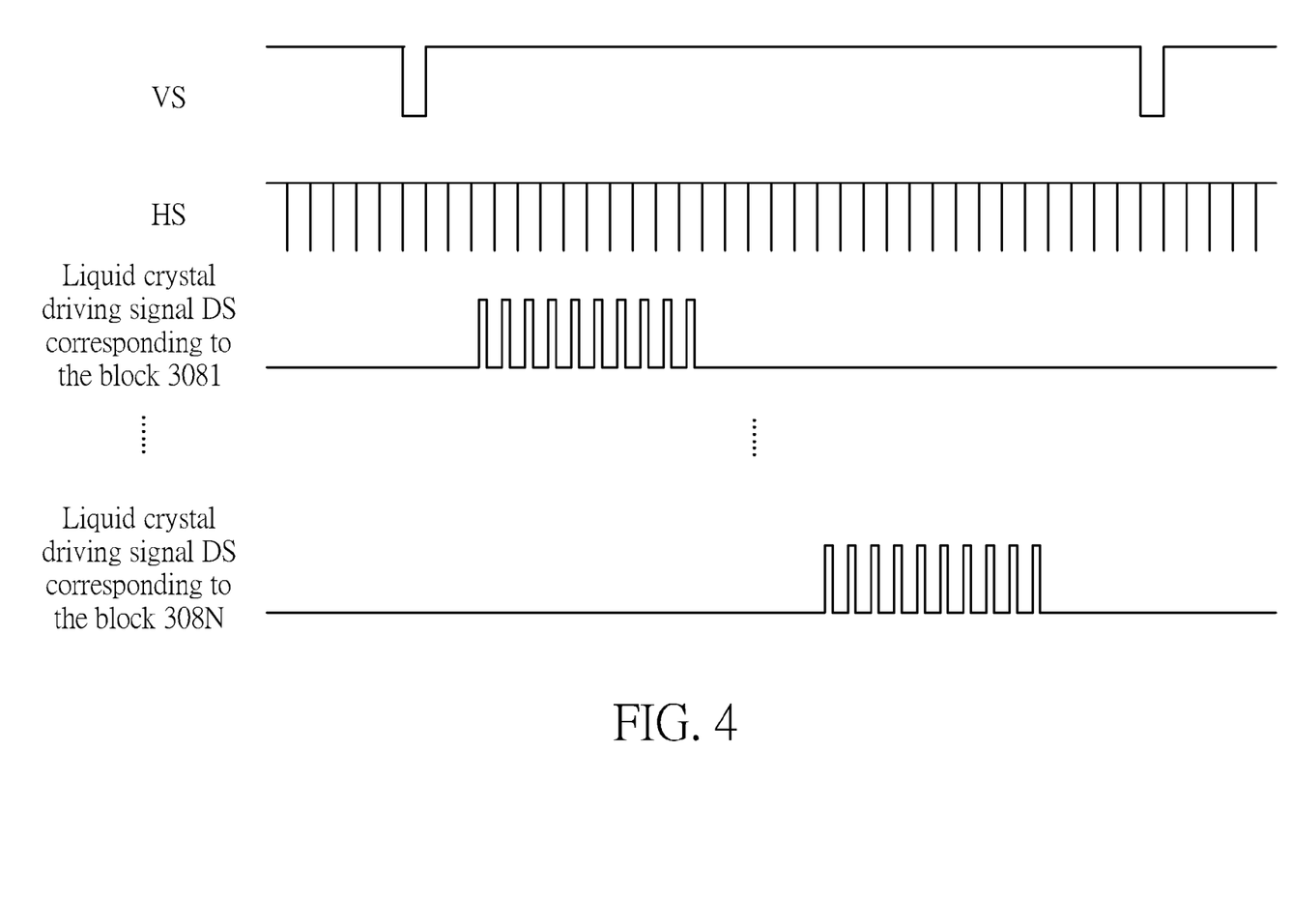
FIG. 4 is a timing diagram illustrating a liquid crystal driving signal corresponding to each block of the N blocks, and a vertical synchronization signal and a horizontal synchronization signal of the touch panel.
Figure 5:
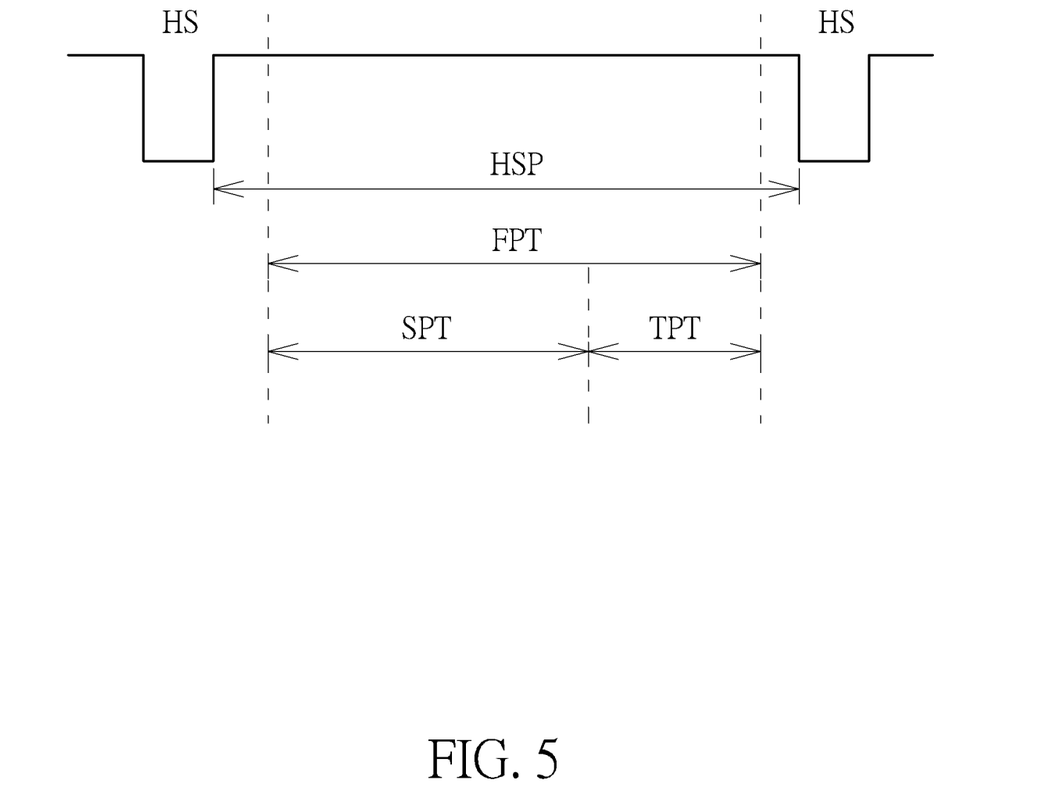
FIG. 5 is a timing diagram illustrating a first predetermined time, a second predetermined time, and a third predetermined time within a horizontal synchronization signal period between two vertical synchronization signals of the touch panel.
Figure 6:
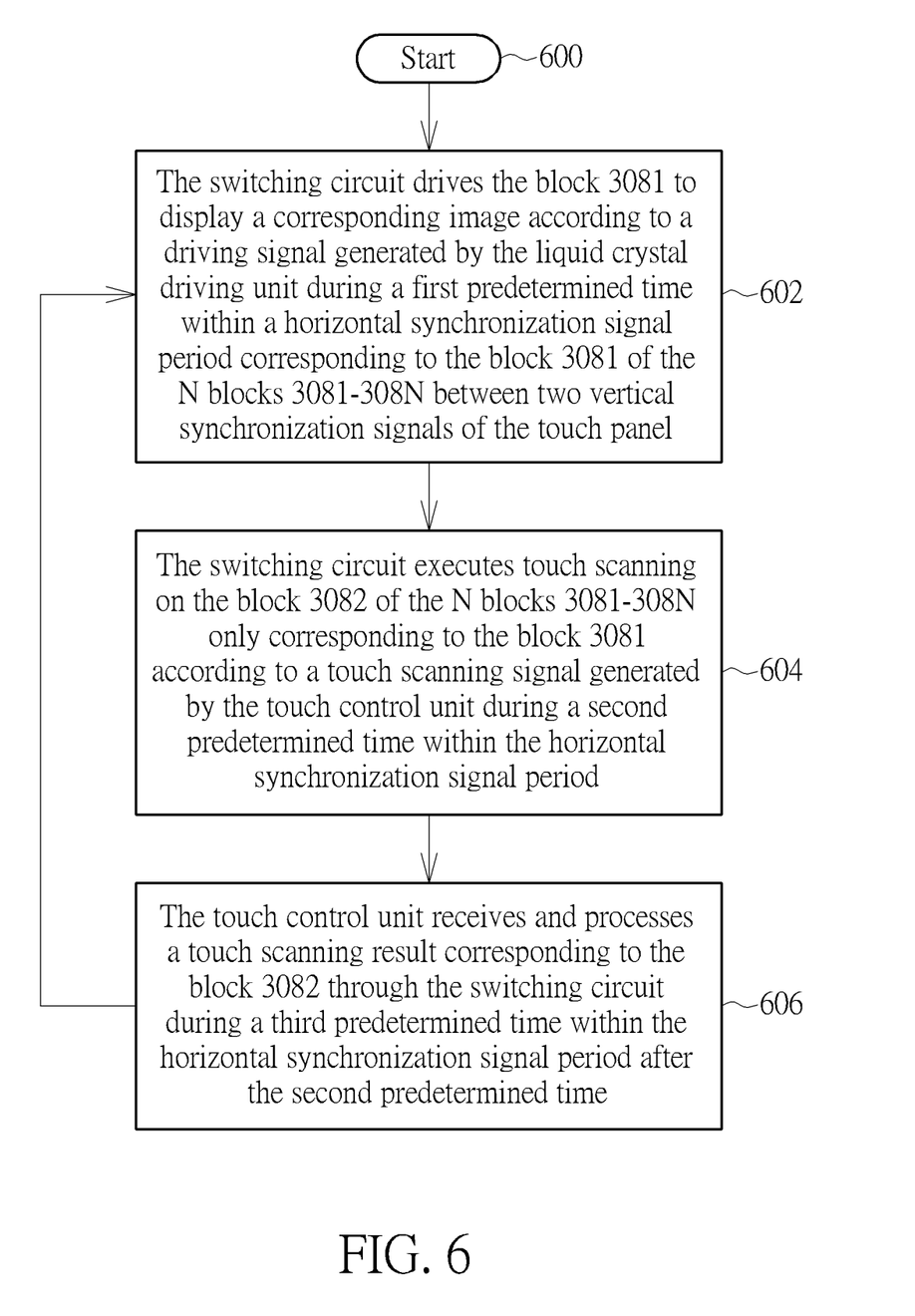
FIG. 6 is a flowchart illustrating a method of driving touch display according to an embodiment.

Please refer to FIG. 3. FIG. 3 is a diagram illustrating a touch display 300. As shown in FIG. 3, the touch display 300 includes a liquid crystal driving unit 302, a touch control unit 304, a switching circuit 306, and a touch panel 308, wherein the touch panel 308 includes N blocks 3081-308N, and N is a positive integer, wherein the touch panel 308 is an in-cell capacitive touch panel, an on-cell capacitive touch panel, or a common type touch panel. Please refer to FIG. 4, FIG. 5, and FIG. 6. FIG. 4 is a timing diagram illustrating a liquid crystal driving signal corresponding to each block of the N blocks 3081-308N, and a vertical synchronization signal VS and a horizontal synchronization signal HS of the touch panel 308, FIG. 5 is a timing diagram illustrating a first predetermined time FPT, a second predetermined time SPT, and a third predetermined time TPT within a horizontal synchronization signal period HSP between two vertical synchronization signals VS of the touch panel 308, and FIG. 6 is a flowchart illustrating a method of driving touch display according to an embodiment. The method in FIG. 6 is illustrated using the touch display 300 in FIG. 3, FIG. 4, and FIG. 5. Detailed steps are as follows:

Step 600: Start.

Step 602: The switching circuit 306 drives the block 3081 to display a corresponding image according to a driving signal DS generated by the liquid crystal driving unit 302 during a first predetermined time FPT within a horizontal synchronization signal period HSP corresponding to the block 3081 of the N blocks 3081-308N between two vertical synchronization signals VS of the touch panel 308.

Step 604: The switching circuit 306 executes touch scanning on the block 3082 of the N blocks 3081-308N only corresponding to the block 3081 according to a touch scanning signal TSS generated by the touch control unit 304 during a second predetermined time SPT within the horizontal synchronization signal period HSP.

Step 606: The touch control unit 304 receives and processes a touch scanning result corresponding to the block 3082 through the switching circuit 306 during a third predetermined time TPT within the horizontal synchronization signal period HSP after the second predetermined time SPT, go to Step 602.

As shown in FIG. 4, because the block 3081 includes a plurality of pixel lines, and each pixel line of the plurality of pixel lines of the block 3081 corresponds to a horizontal synchronization signal HS of the touch panel 308, a plurality of horizontal synchronization signals HS corresponding to the block 3081 exist between the two vertical synchronization signals VS of the touch panel 308. Similarly, a plurality of horizontal synchronization signals HS corresponding to each block of the N blocks 3082-308N exist between the two vertical synchronization signals VS of the touch panel 308. In addition, as shown in FIG. 5, a horizontal synchronization signal period HSP is between any two horizontal synchronization signals HS, a plurality of horizontal synchronization signal periods HSP corresponding to the block 3081 also exist between the two vertical synchronization signals VS of the touch panel 308. In Step 602, as shown in FIG. 5, the switching circuit 306 drives the block 3081 to display the corresponding image during the first predetermined time FPT within the horizontal synchronization signal period HSP corresponding to the block 3081 between the two vertical synchronization signals VS of the touch panel 308 according to the driving signal DS generated by the liquid crystal driving unit 302. In Step 604, as shown in FIG. 5, because a common voltage layer of the touch panel 308 also simultaneously acts as a driving layer of a plurality of touch sensing units of the touch panel 308, the switching circuit 306 executes touch scanning on the block 3082 of the N blocks 3081-308N only corresponding to the block 3081 according to the touch scanning signal TSS generated by the touch control unit 304 during the second predetermined time SPT within the horizontal synchronization signal period HSP, wherein the second predetermined time SPT is less than the first predetermined time FPT, and the second predetermined time SPT overlaps the first predetermined time FPT (as shown in FIG. 5). That is to say, meanwhile, the block (the block 3081) of the touch panel 308 for displaying images touch panel 308 is different from the block (the block 3082) of the touch panel 308 for touch scanning. In Step 606, as shown in FIG. 5, the touch control unit 304 receives and processes the touch scanning result corresponding to the block 3082 through the switching circuit 306 during the third predetermined time TPT within the horizontal synchronization signal period HSP after the second predetermined time SPT, wherein the third predetermined time TPT is less than or equal to a difference between the first predetermined time FPT and the second predetermined time SPT. Then, go to Step 602 to repeatedly execute the above mentioned steps until completion of the plurality of horizontal synchronization signal periods HSP corresponding to the block 3081.

Similarly, operational principles of the block 3082 are also the same as those of the block 3081. For example, after the plurality of horizontal synchronization signal periods HSP corresponding to the block 3081 are completed, the switching circuit 306 drives the block 3082 to display a corresponding image according to the driving signal DS generated by the liquid crystal driving unit 302 during a first predetermined time within a horizontal synchronization signal period corresponding to the block 3082 between two vertical synchronization signals VS of the touch panel 308. The switching circuit 306 executes touch scanning on the block 3083 of the N blocks 3081-308N only corresponding to the block 3082 according to the touch scanning signal TSS generated by the touch control unit 304 during a second predetermined time within the horizontal synchronization signal period corresponding to the block 3082. The touch control unit 304 receives and processes a touch scanning result corresponding to the block 3083 through the switching circuit 306 during a third predetermined time within the horizontal synchronization signal period corresponding to the block 3082 after the second predetermined time within the horizontal synchronization signal period corresponding to the block 3082. In addition, operational principles of other blocks of the N blocks 3081-308N are the same as those of the block 3081, so further description thereof is omitted for simplicity.

Figure 7:
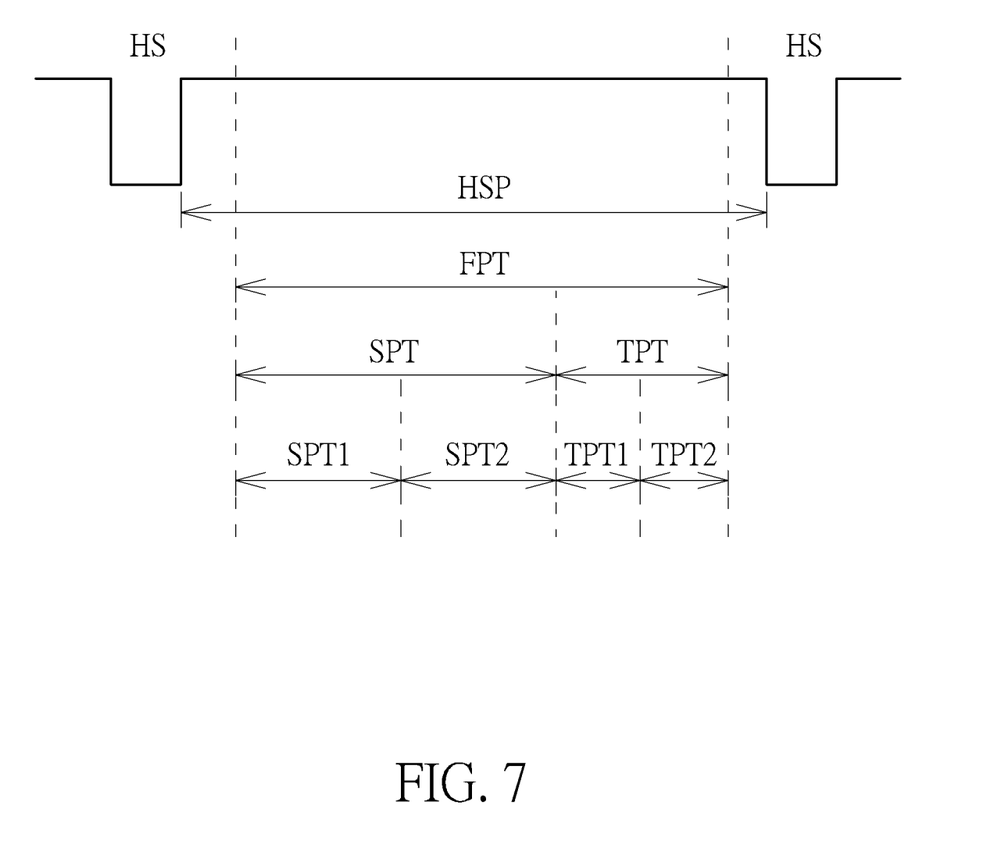
FIG. 7 is a timing diagram illustrating a first predetermined time, a second predetermined time, and a third predetermined time within a horizontal synchronization signal period between two vertical synchronization signals of the touch panel according to another embodiment.
Figure 8:
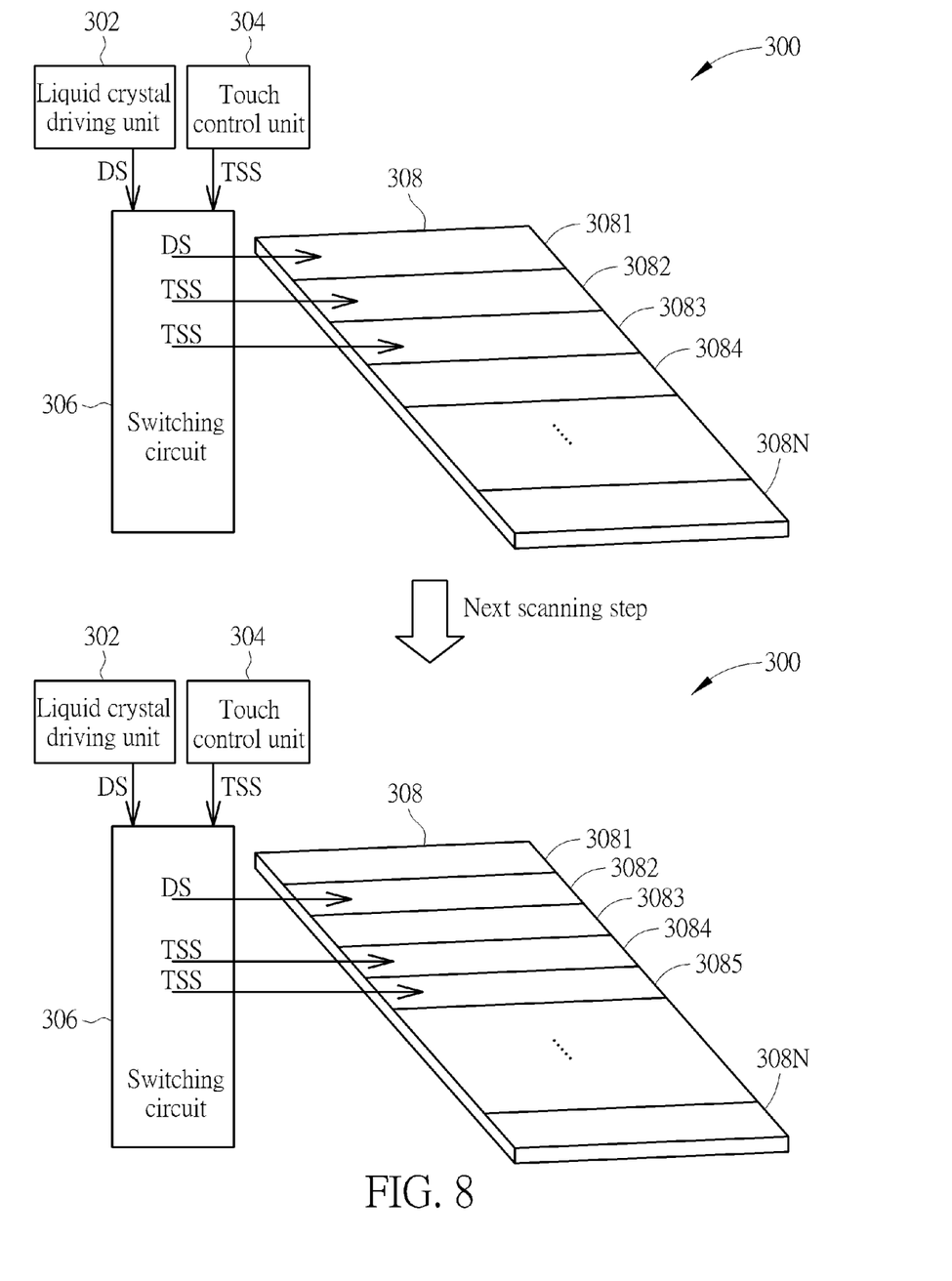
FIG. 8 is a diagram illustrating driving the touch display according to the timing in FIG. 7.

Please refer to FIG. 7 and FIG. 8. FIG. 7 is a timing diagram illustrating a first predetermined time FPT, a second predetermined time SPT, and a third predetermined time TPT within a horizontal synchronization signal period HSP between two vertical synchronization signals VS of the touch panel 308 according to another embodiment, and FIG. 8 is a diagram illustrating driving the touch display 300 according to the timing in FIG. 7. A difference between the timing in FIG. 7 and the timing in FIG. 5 is that in Step 604, during the second predetermined time SPT within the horizontal synchronization signal period HSP, the switching circuit 306 executes touch scanning on the blocks 3082, 3083 of the N blocks 3081-308N only corresponding to the block 3081 according to the touch scanning signal TSS generated by the touch control unit 304, respectively. That is to say, the switching circuit 306 executes touch scanning on the block 3082 according to the touch scanning signal TSS generated by the touch control unit 304 during a period SPT1 within the second predetermined time SPT, and executes touch scanning on the block 3083 according to the touch scanning signal TSS generated by the touch control unit 304 during a period SPT2 within the second predetermined time SPT, wherein length of the period SPT1 is equal to length of the period SPT2; and in Step 606, during the third predetermined time TPT within the horizontal synchronization signal period HSP after the second predetermined time SPT, the touch control unit 304 receives and processes touch scanning results corresponding to the blocks 3082, 3083 through the switching circuit 306, respectively. That is to say, the touch control unit 304 receives and processes the touch scanning result corresponding to the block 3082 through the switching circuit 306 during a period TPT1 within the third predetermined time TPT, and the touch control unit 304 receives and processes the touch scanning result corresponding to the block 3083 through the switching circuit 306 during a period TPT2 within the third predetermined time TPT, wherein length of the period TPT1 is equal to length of the period TPT2.

Similarly, operational principles of the block 3082 are also the same as those of the block 3081. For example, after the plurality of horizontal synchronization signal periods HSP corresponding to the block 3081 are completed, the switching circuit 306 drives the block 3082 to display a corresponding image according to the driving signal DS generated by the liquid crystal driving unit 302 during a first predetermined time within a horizontal synchronization signal corresponding to the block 3082 between the two vertical synchronization signals VS of the touch panel 308. The switching circuit 306 executes touch scanning on the blocks 3084, 3085 of the N blocks 3081-308N only corresponding to the block 3082 according to the touch scanning signal TSS generated by the touch control unit 304 during a second predetermined time within the horizontal synchronization signal corresponding to the block 3082. After the second predetermined time, during a third predetermined time within the horizontal synchronization signal corresponding to the block 3082, the touch control unit 304 receives and processes touch scanning results corresponding to the blocks 3084, 3085 through the switching circuit 306, respectively. In addition, operational principles of other blocks of the N blocks 3081-308N are the same as those of the block 3081, so further description thereof is omitted for simplicity.

In addition, in another embodiment of the present invention, in Step 604, the switching circuit 306 executes touch scanning on M blocks of the N blocks 3081-308N only corresponding to the block 3081 respectively according to the touch scanning signal TSS generated by the touch control unit 304 during a second predetermined time SPT within a horizontal synchronization signal period HSP corresponding to the block 3081, wherein M is a positive integer, and M is less than N.

To sum up, compared to the prior art, because the method of driving touch display and the touch display utilize a channel division multiplexing driving method (as shown in FIG. 5 and FIG. 7), the present invention has advantages as follows: first, touch scanning time (that is, the second predetermined time) of the touch panel is greater than touch scanning time of the prior art; second, because display image and touch scanning of touch panel can be simultaneously executed, a frequency of a touch scanning signal of the touch panel can be adjusted with a practical requirement of a signal-to-noise ratio of the touch panel to increase the signal-to-noise ratio of the touch panel; third, because the present invention can execute a plurality of touch scanning within a frame of the touch panel, the present invention can increase the frequency of the touch scanning signal of the touch panel to increase a report rate of the touch panel; and fourth, the present invention can be applied to an on-cell capacitive touch panel, an in-cell capacitive touch panel, and a common type touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of driving touch display, wherein the touch display comprises a liquid crystal driving unit, a touch control unit, a switching circuit, and a touch panel, wherein the touch panel comprises N blocks, and N is a positive integer, the method comprising:

the switching circuit driving each block of the N blocks to display a corresponding image according to a driving signal generated by the liquid crystal driving unit during a first predetermined time within each horizontal synchronization signal period corresponding to the block between two vertical synchronization signals of the touch panel;

the switching circuit executing touch scanning on M blocks of the N blocks only corresponding to the block according to touch scanning signals generated by the touch control unit during a second predetermined time within the horizontal synchronization signal period, wherein M is a positive integer, M is less than N, and the second predetermined time overlaps the first predetermined time; and the touch control unit receiving and processing a touch scanning result corresponding to each block of the M blocks through the switching circuit during a third predetermined time within the horizontal synchronization signal period after the second predetermined time;

wherein during the second predetermined time, the touch control unit does not receive and process any touch scanning result; and during the third predetermined time, the switching circuit does not execute any touch scanning.

2. The method of claim 1, wherein the block comprises a plurality of pixel lines, and each pixel line of the plurality of pixel lines corresponds to a horizontal synchronization signal of the touch panel.

3. The method of claim 1, wherein the touch panel is an in-cell capacitive touch panel.

4. The method of claim 1, wherein the touch panel is an on-cell capacitive touch panel.

5. The method of claim 1, wherein the second predetermined time is less than the first predetermined time.

6. The method of claim 5, wherein the third predetermined time is less than or equal to a difference between the first predetermined time and the second predetermined time.

7. A touch display capable of increasing signal-to-noise ratio, the touch display comprising:
- a liquid crystal driving unit;
- a touch control unit;
- a switching circuit; and
- a touch panel comprising N blocks, and N is a positive integer;
- wherein the switching circuit drives each block of the N blocks to display a corresponding image according to a driving signal generated by the liquid crystal driving unit during a first predetermined time within each horizontal synchronization signal period corresponding to the block between two vertical synchronization signals of the touch panel; the switching circuit executes touch scanning on M blocks of the N blocks only corresponding to the block according to touch scanning signals generated by the touch control unit during a second predetermined time within the horizontal synchronization signal period, wherein M is a positive integer, M is less than N, and the second predetermined time overlaps the first predetermined time; and the touch control unit receives and processes a touch scanning result corresponding to each block of the M blocks through the switching circuit during a third predetermined time within the horizontal synchronization signal period after the second predetermined time; and
- wherein during the second predetermined time, the touch control unit does not receive and process any touch scanning result; and during the third predetermined time, the switching circuit does not execute any touch scanning.

8. The touch display of claim 7, wherein the block comprises a plurality of pixel lines, and each pixel line of the plurality of pixel lines corresponds to a horizontal synchronization signal of the touch panel.

9. The touch display of claim 7, wherein the second predetermined time is less than the first predetermined time.

10. The touch display of claim 9, wherein the third predetermined time is less than or equal to a difference between the first predetermined time and the second predetermined time.

* * * * *